US009813946B2

(12) United States Patent
Zhang

(10) Patent No.: US 9,813,946 B2
(45) Date of Patent: Nov. 7, 2017

(54) DIRECT HANDOVER METHOD AND DEVICE

(71) Applicant: Huawei Technologies Co., Ltd., Shenzhen (CN)

(72) Inventor: Wanqiang Zhang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 144 days.

(21) Appl. No.: 14/700,885

(22) Filed: Apr. 30, 2015

(65) Prior Publication Data
US 2015/0237532 A1 Aug. 20, 2015

Related U.S. Application Data

(63) Continuation of application No. PCT/CN2013/086357, filed on Oct. 31, 2013.

(30) Foreign Application Priority Data

Oct. 31, 2012 (CN) .......................... 2012 1 0426023

(51) Int. Cl.
H04W 36/00 (2009.01)
(52) U.S. Cl.
CPC .... H04W 36/0005 (2013.01); H04W 36/0033 (2013.01)
(58) Field of Classification Search
None
See application file for complete search history.

(56) References Cited

U.S. PATENT DOCUMENTS

2007/0254667 A1  11/2007 Jokinen
2010/0255844 A1  10/2010 Fischer et al.
(Continued)

FOREIGN PATENT DOCUMENTS

CN  101132612 A  2/2008
CN  101132640 A  2/2008
(Continued)

OTHER PUBLICATIONS

Callendar et al., "Mobility," LTE for UMTS—OFDMA and SC-FDMA Based Radio Access, pp. 165-180, John Wiley & Sons, Ltd., United Kingdom (Jan. 16, 2009).

Primary Examiner — Edan Orgad
Assistant Examiner — Saumit Shah
(74) Attorney, Agent, or Firm — Leydig, Voit & Mayer, Ltd.

(57) ABSTRACT

A direct handover method and device are provided. The method comprises: receiving a handover message sent by a source side access network node; selecting a destination side core network node, and sending a handover message to the destination side core network node, so that the destination side core network node obtains context information of a UE from a source side core network node; receiving a handover acknowledge message sent by the destination side core network node. The source side access network node sends the handover message to a destination side access network node, the destination side access network node selects the destination side core network node, and sends the handover message to the destination side core network node, and the destination side core network node requests the context information of the UE from the source side core network node, so as to complete the handover.

20 Claims, 9 Drawing Sheets

(56) References Cited

U.S. PATENT DOCUMENTS

| | | | |
|---|---|---|---|
| 2011/0045834 A1* | 2/2011 | Kim | H04L 45/306 |
| | | | 455/438 |
| 2011/0075675 A1* | 3/2011 | Koodli | H04L 12/14 |
| | | | 370/401 |
| 2012/0071164 A1* | 3/2012 | Hayashi | H04W 36/12 |
| | | | 455/436 |
| 2012/0190368 A1* | 7/2012 | Zhang | H04W 36/0055 |
| | | | 455/436 |
| 2015/0156691 A1 | 6/2015 | Hayashi | |

FOREIGN PATENT DOCUMENTS

| | | |
|---|---|---|
| CN | 101500322 A1 | 8/2009 |
| CN | 101621838 A | 1/2010 |
| CN | 102281586 A | 12/2011 |
| EP | 1892993 A2 | 2/2008 |

* cited by examiner

DIRECT HANDOVER METHOD AND DEVICE

CROSS-REFERENCE TO RELATED APPLICATIONS

This application is a continuation of International Patent Application No. PCT/CN2013/086357, filed on Oct. 31, 2013, which claims priority to Chinese Patent Application No. 201210426023.X, filed on Oct. 31, 2012, both of which are hereby incorporated by reference in their entireties.

FIELD

The invention relates to the field of communication, and in particular, to a direct handover method and a direct handover device.

BACKGROUND

A source-side node is a communication node used by a terminal in a communication. The source-side node may be, for example, a source-side core network node or a source-side access network node.

A target-side node is a communication node used by the terminal in the communication after a handover. The target-side node may be, for example, a target-side core network node or a target-side access network node.

The terminal may usually encounter a problem of handover between communication nodes in the communication. Mainly, an access network node and a core network node are involved in the handover between the communication nodes. If only the access network nodes are involved in the handover between the communication nodes, the handover may be performed between the access network nodes through an X2 interface. The handover between the communication nodes is very complicated if the core network node are involved in the handover. An S1 interface handover may be executed in the handover, once a Mobility Management Entity (MME) alters. A handover procedure starts from a source-side evolved Node B (ENB) and arrives at a target-side MME via a source-side MME. Then, the target-side MME interacts with a target-side ENB and forwards related information to the source-side ENB via the source-side MME, to complete the handover procedure. Multiple times of interactions between MME and ENB are involved in the procedure and the signaling procedure is complicated. Network congestion may be easily caused if many UEs initiate similar handovers. An inter-RAT handover (a handover between GSM EDGE Radio Access Network/Universal Terrestrial Radio Access Network (GERAN/UTRAN) and Evolved Universal Terrestrial Radio Access Network (EUTRAN)) is similar to the above (in the inter-RAT handover, Serving GPRS Support Node (SGSN) provides a service for the GERAN/UTRAN and MME provides a service for the EUTRAN, which is equivalent to the case that CN node alters). Multiple times of interactions between CN and RAN are involved in the handover, which also increases the signalling burden of the network and causes a waste of the network resource.

SUMMARY

Embodiments of the invention intend to provide a direct handover method and a direct handover device, to solve the problems in conventional technologies that the handover procedure is complicated and network congestion is easily caused.

In one aspect, a direct handover method is provided in the invention. The method includes:

receiving a handover message transmitted by a source-side access network node;

selecting a target-side core network node, and transmitting the handover message to the target-side core network node, wherein the target-side core network node acquires context information of User Equipment (UE) from a source-side core network node; and receiving a handover acknowledgement message transmitted by the target-side core network node.

In another aspect, a direct handover method is provided in the invention. The method includes:

receiving a handover message transmitted by a target-side access network node, wherein the handover message carries identification information of a source-side core network node, and identification allocated for UE by the source-side core network node;

acquiring an address of the source-side core network node based on the identification information of the source-side core network node, and transmitting a handover request message, wherein the handover request message carries the identification allocated by the source-side core network node for the UE, and the source-side core network node acquires context information of the UE based on the identification information allocated for the UE; and receiving a handover request response message transmitted by the source-side core network node.

In another aspect, a direct handover method is provided in the invention. The method includes:

transmitting a handover message to a target-side access network node;

receiving a resource release message transmitted by the target-side access network node; and receiving a resource release request transmitted by a source-side core network node, and performing a resource release with the source-side core network node.

In another aspect, a direct handover method is provided in the invention. The method includes:

receiving a handover request message transmitted by a target-side core network node, wherein the handover request message includes identification information allocated for UE by a source-side core network node;

acquiring context information of the UE based on the identification information; and transmitting a handover response message to the target-side core network node, wherein the handover response message includes the acquired context information of the UE.

In another aspect, a direct handover device is provided in the invention. The device includes:

a handover message reception unit, adapted to receive a handover message transmitted by a source-side access network node;

a target-side core network node selection unit, adapted to select a target-side core network node after the handover message reception unit receives the handover message;

a handover message transmitting unit, adapted to transmit the handover message to the target-side core network node selected by the target-side core network node selection unit, wherein the target-side core network node acquires context information of UE from a source-side core network node; and a handover acknowledgement message reception unit adapted to receive a handover acknowledgement message transmitted by the target-side core network node, after the handover message transmitting unit transmits the handover message.

In another aspect, a direct handover device is provided in the invention. The device includes:

a handover message reception unit, adapted to receive a handover message transmitted by a target-side access network node, wherein the handover message carries identification information of a source-side core network node and identification information allocated for UE by the source-side core network node;

a source-side core network node address acquisition unit, adapted to acquire an address of the source-side core network node, based on the identification information of the source-side core network node received by the handover message reception unit;

a handover request message transmitting unit, adapted to transmit a handover request message to the source-side core network node, an address of the source-side core network node being acquired by the source-side core network node address acquisition unit, wherein the source-side core network node acquires context information of the UE based on the identification information allocated for the UE and carried in the handover request message; and a handover response message reception unit, adapted to receive a handover response message transmitted by the source-side core network node, after the handover request message transmitting unit transmits the handover request message.

In another aspect, a direct handover device is provided in the invention. The device includes:

a handover message transmitting unit, adapted to transmit a handover message to a target-side access network node;

a resource release message reception unit adapted to receive a resource release message transmitted by the target-side access network node, after the handover message transmitting unit transmits the handover message;

a resource release request reception unit adapted to receive a resource release request initiated by a source-side core network node, after the resource release message reception unit receives the resource release message; and a resource release unit adapted to performing a resource release with the source-side core network node, based on the resource release request received by the resource release request reception unit.

In another aspect, a direct handover device is provided in the invention. The device includes:

a handover request message reception unit adapted to receive a handover request message transmitted by a target-side core network node, wherein the handover request message includes identification information allocated for UE by a source-side core network node;

a context information acquisition unit, adapted to acquire context information of the UE based on the identification information allocated for the UE in the handover request message received by the handover request message reception unit; and a handover response message transmitting unit adapted to transmit a handover response message to the target-side core network node after the context information acquisition unit acquires the context information, wherein the handover response message includes the context information of the UE acquired by the context information acquisition unit.

In the embodiments of the invention, the source-side access network node transmits the handover message to the target-side access network node, the target-side access network node selects the target-side core network node and transmits the handover message to the target-side core network node, and the target-side core network node requests for context information of the UE from the source-side core network node, thereby completing a handover. Thus, the handover may be implemented through less times of signalling interactions between nodes, which avoids network congestion caused by multiple times of signalling interactions.

BRIEF DESCRIPTION OF THE DRAWINGS

For illustrating technical solutions in embodiments of the invention more clearly, drawings to be used in describing the embodiments or conventional technologies are briefly described hereinafter. Apparently, the following described drawings are merely a part of the embodiments of the invention, and other drawings may be obtained by those skilled in the art based on those drawings without creative efforts.

DETAILED DESCRIPTION OF EMBODIMENTS

To make objectives, technical solutions and advantages of the invention clearer and more understandable, the invention is further clarified hereinafter in conjunction with drawings and embodiments. It should be understood that the embodiments described herein are merely to explain rather than to limit the invention.

Explanations are made with the embodiments, to explain the technical solutions of the invention.

Figure 1:
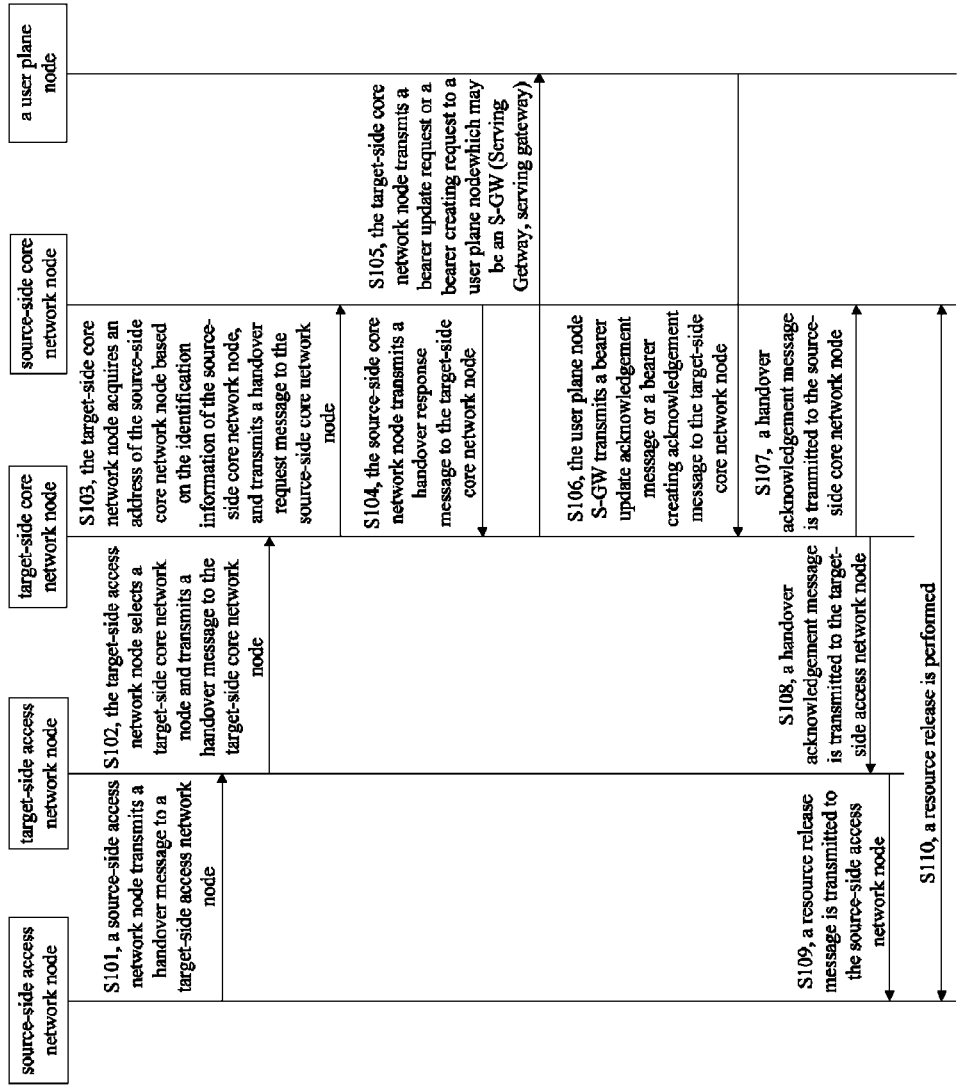
FIG. 1 is a flowchart of a direct handover method according to an embodiment of the invention.

FIG. 1 is a flowchart of a direct handover method according to an embodiment of the invention. The method includes the followings steps.

In step S101, a source-side access network node transmits a handover message to a target-side access network node. The handover message carries identification information of a source-side core network node and identification information allocated for UE by the source-side core network node.

In an embodiment of the invention, the source-side access network node transmits the handover message to the target-side access network node, and the handover message carries the identification information of the source-side core network node and the identification information allocated for UE by the source-side core network node. In different communication networks, identification information of the source-side core network node is different, and identification information allocated for UE by the source-side core network node is also different. Details will be described as follows.

(1). In the case that the source-side access network node is an evolved node base station (eNB), the target-side access network node is an eNB, and the source-side core network node is an mobility management entity (MME), the identification information of the source-side core network node includes but is not limited to a globally unique MME identifier (GUMMEI), and the identification information allocated for the UE by the source-side core network node includes but is not limited to a Source MME UE SIAP ID.

(2). In the case that the source-side access network node is a radio network controller (RNC), the target-side access network node is an RNC, and the source-side core network node is a serving GPRS support node (SGSN), the identification information of the source-side core network node includes but is not limited to a global core network identifier (Global CN-ID), or a combination of a routing area identifier (RAI) and an network resource identifier (NRI), and the identification information allocated for the UE by the source-side core network node includes but is not limited to an Old Iu Signalling Connection Identifier.

(3) In the case that the source-side access network node is an RNC, the target-side access network node is an eNB, and the source-side core network node is an SGSN, the identification information of the source-side core network node includes but is not limited to a Global CN-ID, a combination of an RAI and an NRI, or a GUMMEI into which a combination of an RAI and an NRI is mapped; and the identification information allocated for the UE by the source-side core network node includes but is not limited to an Old Iu Signalling Connection Identifier.

(4) In the case that the source-side access network node is an eNB, the target-side access network node is an RNC, and the source-side core network node is an MME, the identification information of the source-side core network node includes but is not limited to a GUMMEI, or a combination of an RAI and an NRI, where a GUMMEI is mapped into the combination; and the identification information allocated for the UE by the source-side core network node includes but is not limited to a Source MME UE SIAP ID.

In step S102, the target-side access network node selects a target-side core network node and transmits the handover message to the target-side core network node. The handover message also includes the identification information of the source-side core network node and the identification information allocated for the UE by the source-side core network node as described above. The handover message includes but is not limited to a Path Switch Request (path switch request) message or an Enhanced Relocation Complete Request message.

In an embodiment of the invention, the target-side access network node may select the target-side core network node based on a condition of load balance. That is, a target-side core network node with a lowest load is selected and accessed to implement the load balance.

In step S103, the target-side core network node acquires an address of the source-side core network node based on the identification information of the source-side core network node, and transmits a handover request message to the source-side core network node. The handover request message includes the identification information allocated for the UE by the source-side core network node.

In step S104, the source-side core network node transmits a handover response message to the target-side core network node. The handover response message includes an international mobile subscriber identifier (IMSI) of the UE, context information for mobility management, and context information for session management.

In step S105, the target-side core network node sends a bearer update request or a bearer creating request to a user plane node. The user plane node may be a serving gateway (S-GW).

In an embodiment of the invention, a connected user plane node S-GW may alters in a handover process of communication nodes. Hence, the bearer update request is transmitted if the user plane node S-GW does not alter; and the bearer creating request is transmitted if the user plane node S-GW alters.

In step S106, the user plane node S-GW transmits to the target-side core network node a bearer update acknowledgement message or a bearer creating acknowledgement message.

In step S107, the target-side core network node transmits a handover acknowledgement message to the source-side core network node.

In step S108, the target-side core network node transmits the handover acknowledgement message to the target-side access network node.

In step S109, the target-side access network node transmits a resource release message to the source-side access network node.

In step S110, the source-side core network node initiates a resource release with the source-side access network node after receiving the handover acknowledgement message.

It should be noted that, an inter-SGSN handover which occurs when the UE locates in a GERAN is similar to the above descriptions, where the RNC/eNB is replaced by a Base Station System (BSS), the identification information for the UE is a TLLI temporary logical link identity. Other steps are similar to the above descriptions, which will be omitted herein.

In an embodiment of the invention, the source-side access network node transmits the handover message to the target-side access network node, the target-side access network node selects the target-side core network node and transmits the handover message to the target-side core network node, and the target-side core network node requests for context information of the UE from the source-side core network node, thereby completing a handover. Thus, the handover may be implemented through less times of signalling interactions between nodes, which avoids network congestion caused by multiple times of signalling interactions.

It should be noted that in the embodiment of the invention, the access network node may be RNC, BSS and eNB, the core network node may be MME and SGSN, and the user plane node may be S-GW, P-GW and GGSN.

Figure 2:
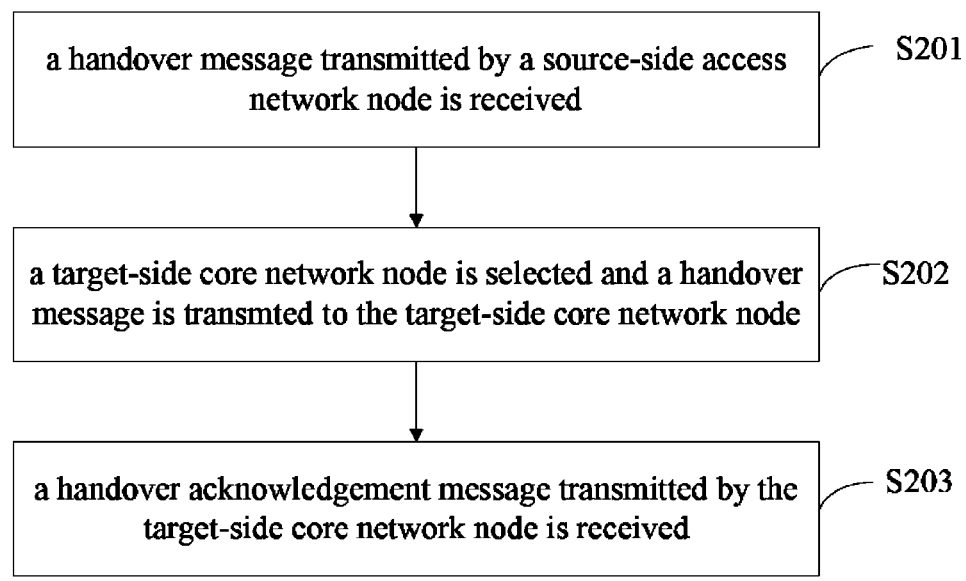
FIG. 2 is a flowchart of a direct handover method according to another embodiment of the invention.

FIG. 2 is a flowchart of a direct handover method according to another embodiment of the invention. The method includes the followings steps.

In step S201, a handover message transmitted by a source-side access network node is received.

In an embodiment of the invention, the source-side access network node transmits the handover message to a target-side access network node. The handover message carries identification information of a source-side core network node and identification information allocated for UE by the source-side core network node. In different communication networks, identification information of the source-side core network node is different, and identification information allocated for the UE by the source-side core network node is also different. Details will be described as follows.

(1). In the case that the source-side access network node is an evolved node base station (eNB), the target-side access network node is an eNB, and the source-side core network node is a mobility management entity (MME), the identification information of the source-side core network node includes but is not limited to a globally unique MME identifier (GUMMEI), and the identification information allocated for the UE by the source-side core network node includes but is not limited to a Source MME UE S1AP ID.

(2). In the case that the source-side access network node is a radio network controller (RNC), the target-side access network node is an RNC, and the source-side core network node is a serving GPRS support node (SGSN), the identification information of the source-side core network node includes but is not limited to a global core network identifier (Global CN-ID) or a combination of a routing area identifier (RAI) and a network resource identifier (NRI), and the identification information allocated for the UE by the source-side core network node includes but is not limited to an Old Iu Signalling Connection Identifier.

(3) In the case that the source-side access network node is an RNC, the target-side access network node is an eNB, and the source-side core network node is an SGSN, the identification information of the source-side core network node includes but is not limited to a Global CN-ID, a combination of an RAI and an NRI, or a GUMMEI into which a combination of an RAI and an NRI is mapped; and the identification information allocated for the UE by the source-side core network node includes but is not limited to an Old Iu Signalling Connection Identifier.

(4) In the case that the source-side access network node is an eNB, the target-side access network node is an RNC, and the source-side core network node is an MME, the identification information of the source-side core network node includes but is not limited to a GUMMEI, or a combination of an RAI and an NRI, where a GUMMEI is mapped into the combination; and the identification information allocated for the UE by the source-side core network node includes but is not limited to a Source MME UE S1AP ID.

In step S202, a target-side core network node is selected and the handover message is transmitted to the target-side core network node. The handover message also includes the identification information of the source-side core network node and the identification information allocated for the UE by the source-side core network node as described above. Hence, the target-side core network node acquires context information of the UE from the source-side core network node. The context information includes an international mobile subscriber identifier (IMSI) of the UE, context information of mobility management, and context information of session management.

In an embodiment of the invention, the target-side access network node may select the target-side core network node based on a condition of load balance. That is, a target-side core network node with a lowest load is selected and accessed to implement the load balance.

In step S203, a handover acknowledgement message transmitted by the target-side core network node is received.

In an embodiment of the invention, the target-side access network node confirms that a communication link is established between the target-side core network node and the target-side access network node, after receiving the handover acknowledgement message transmitted by the target-side core network node. The target-side access network node transmits a resource release message to the source-side access network node, to make the source-side access network node release resource which is no longer used.

According to an optional embodiment of the invention, after the step S203, the method further includes the following step:

transmitting a resource release message to the source-side access network node based on the handover acknowledgement message, where the source-side access network node releases a resource between the source-side access network node and the source-side core network node.

In an embodiment of the invention, the source-side access network node transmits the handover message to the target-side access network node; and the target-side access network node selects the target-side core network node and transmits the handover message to the target-side core network node. The target-side core network node requests for the context information of the UE from the source-side core network node, thereby completing a handover. The handover may be implemented through less times of signalling interactions between nodes, which avoids network congestion caused by multiple times of signalling interactions.

Figure 3:
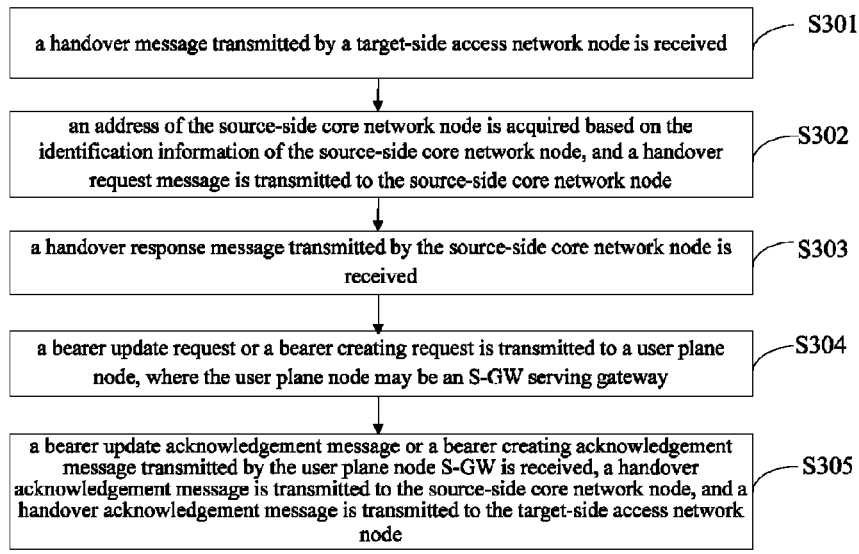
FIG. 3 is a flowchart of a direct handover method according to further another embodiment of the invention.

FIG. 3 is a flowchart of a direct handover method according to further another embodiment of the invention. The method includes the followings steps.

In step S301, a handover message transmitted by a target-side access network node is received. The handover message carries identification information of a source-side core network node and identification information allocated for UE by the source-side core network node.

In an embodiment of the invention, a target-side core network node receives the handover message transmitted by the target-side access network node. The target-side core network node may be selected by the target-side access network node based on a condition of load balance. A target-side core network node with a lowest load is selected and accessed to achieve the load balance.

In step S302, an address of the source-side core network node is acquired based on the identification information of the source-side core network node, and a handover request message is transmitted to the source-side core network node. The handover request message includes the identification information allocated for the UE by the source-side core network node.

In step S303, a handover response message transmitted by the source-side core network node is received. The handover response message includes an international mobile subscriber identifier (IMSI) of the UE, context information of mobility management, and context information of session management.

In step S304, a bearer update request or a bearer creating request is transmitted to a user plane node, where the user plane node may be a serving gateway (S-GW).

In an embodiment of the invention, a connected user plane node S-GW may alters in a handover process of communication nodes. Hence, the bearer update request is transmitted if the user plane node S-GW does not alter; and the bearer creating request is transmitted if the user plane node S-GW alters.

In step S305, a bearer update acknowledgement message or bearer creating acknowledgement message transmitted by the user plane node S-GW is received, a handover acknowledgement message is transmitted to the source-side core network node, and the handover acknowledgement message is transmitted to the target-side access network node.

In an embodiment of the invention, the target-side core network node informs source-side nodes that the handover is completed, after receiving the bearer update acknowledgement message or bearer creating acknowledgement message from the S-GW. Specifically, the target-side core network node transmits the handover acknowledgement message to the target-side access network node and the source-side core network node respectively, and the source-side core network node initiates a resource release to a source-side access network node.

In an embodiment of the invention, the source-side access network node transmits the handover message to the target-side access network node, the target-side access network node selects the target-side core network node and transmits the handover message to the target-side core network node, and the target-side core network node requests for context information of the UE from the source-side core network node, thereby completing a handover. The handover may be implemented through less times of signalling interactions between nodes, which avoids network congestion caused by multiple times of signalling interactions.

Figure 4:
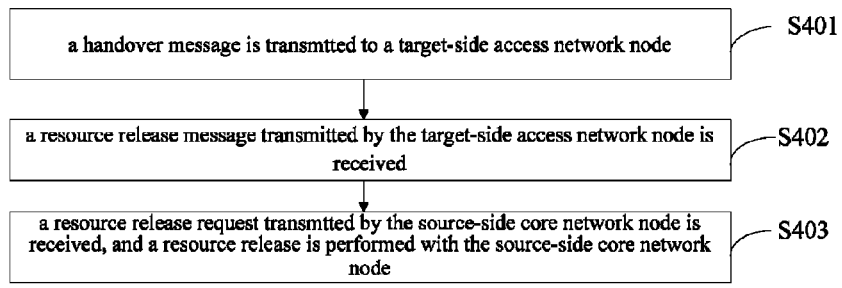
FIG. 4 is a flowchart of a direct handover method according to further another embodiment of the invention.

FIG. 4 is a flowchart of a direct handover method according to further another embodiment of the invention. The method includes the followings steps.

In step S401, a handover message is transmitted to a target-side access network node.

In an embodiment of the invention, a source-side access network node transmits to the target-side access network node a handover starting message, i.e., the handover message. The handover message carries identification information of a source-side core network node and identification information allocated for UE by the source-side core network node. In a subsequent step, a target-side core network node may acquire an address of the source-side core network node based on the identification information of the source-side core network node. The target-side core network node may acquire context information of the UE from the source-side core network node based on the identification information allocated for the UE by the source-side core network node.

In step S402, a resource release message transmitted by the target-side access network node is received.

In an embodiment of the invention, a target-side node (including the target-side core network node and the target-side access network node) may transmit the resource release message to a source-side node after a completion of the handover. Specifically, the source-side access network node receives the resource release message transmitted by the target-side access network node, and the source-side core network node receives the resource release message transmitted by the target-side core network node.

In step S403, a resource release request transmitted by the source-side core network node is received, and a resource release is performed with the source-side core network node.

In an embodiment of the invention, the source-side node starts releasing the resource after receiving the resource release message. Specifically, the source-side core network node initiates the resource release request to the source-side access network node, and the source-side access network node performs the resource release based on the request.

Figure 5:
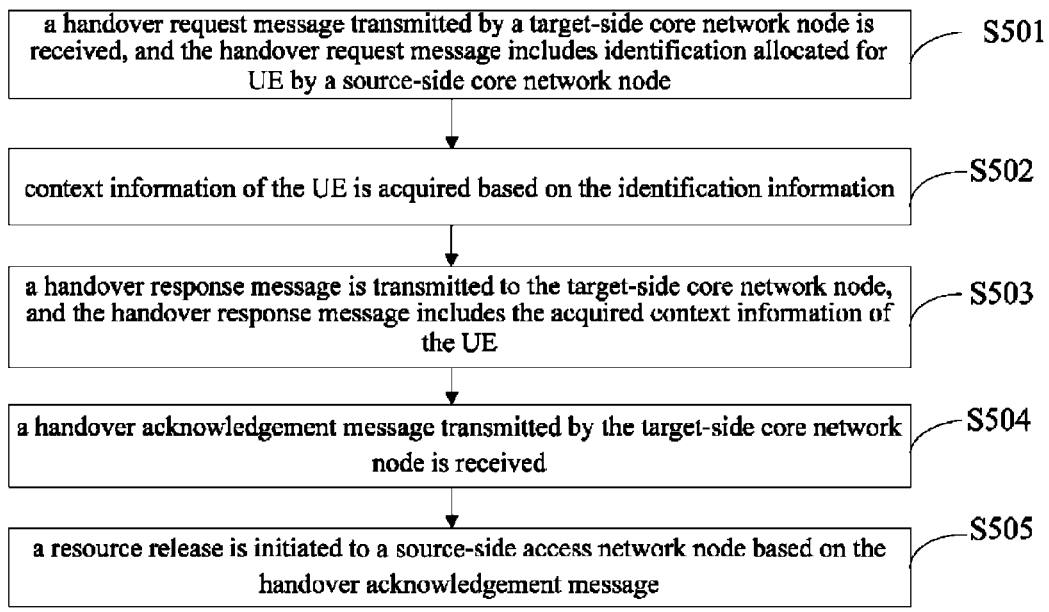
FIG. 5 is a flowchart of a direct handover method according to further another embodiment of the invention.

FIG. 5 is a flowchart of a direct handover method according to further another embodiment of the invention. The method includes the followings steps.

In step S501, a handover request message transmitted by a target-side core network node is received. The handover request message includes identification information allocated for UE by a source-side core network node.

In an embodiment of the invention, the source-side core network node receives the handover request message transmitted by the target-side core network node, where the handover request message includes the identification information allocated for the UE by the source-side core network node.

In step S502, context information of the UE is acquired based on the identification information.

In an embodiment of the invention, the source-side core network node searches for the stored context information of the UE based on the identification information. The context information includes an international mobile subscriber identifier IMSI of the UE, context information of mobility management, and context information of session management.

In step S503, a handover response message is transmitted to the target-side core network node. The handover response message includes the acquired context information of the UE.

In an embodiment of the invention, the source-side core network node transmits the handover response message to the target-side core network node, in response to the handover request message in the step S501. The handover response message includes the acquired context information of the UE. The target-side core network node may build context information with the UE based on the context information of the UE.

According to an optional embodiment of the invention, after the step S503, the method further includes the following steps:

S504, receiving a handover acknowledgement message transmitted by the target-side core network node; and S505, initiating a resource release to a source-side access network node, based on the handover acknowledgement message.

Figure 6:
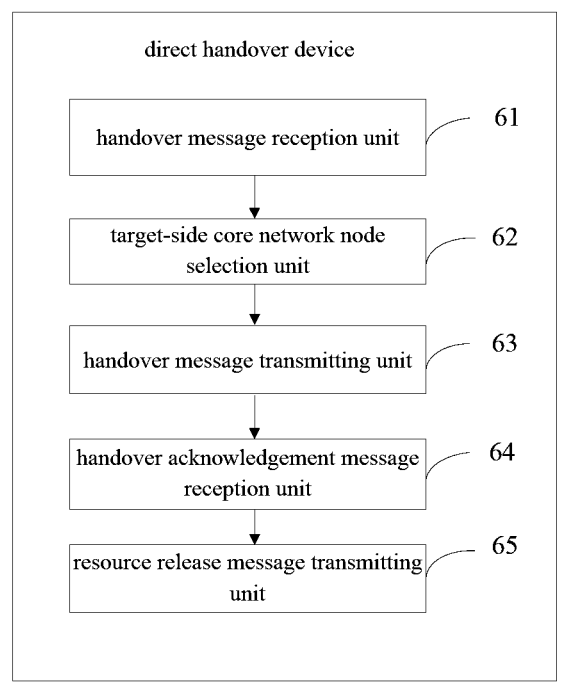
FIG. 6 is a structural diagram of a direct handover device according to an embodiment of the invention.

FIG. 6 is a structural diagram of a direct handover device according to an embodiment target-side core network node selection unit of the invention, and only parts related to the embodiment of the invention are shown for convenience of explanation. The device includes following units.

A handover message reception unit 61 is adapted to receive a handover message transmitted by a source-side access network node.

In an embodiment of the invention, the source-side access network node transmits the handover message to a target-side access network node, and the handover message carries identification information of a source-side core network node and identification information allocated for UE by the source-side core network node. In different communication networks, identification information of the source-side core network node is different, and identification information allocated for the UE by the source-side core network node is also different. Details will be described as follows.

(1). In the case that the source-side access network node is an evolved node based station (eNB), the target-side access network node is an eNB, and the source-side core network node is a mobility management entity (MME), the identification information of the source-side core network node includes but is not limited to a globally unique MME identifier (GUMMEI), and the identification information allocated for the UE by the source-side core network node includes but is not limited to a Source MME UE S1AP ID.

(2). In the case that the source-side access network node is a radio network controller (RNC), the target-side access network node is an RNC, and the source-side core network node is a serving GPRS support node (SGSN), the identification information of the source-side core network node includes but is not limited to a global core network identifier (Global CN-ID) or a combination of a routing area identifier (RAI) and a network resource identifier (NRI), and the identification information allocated for the UE by the source-side core network node includes but is not limited to an Old Iu Signalling Connection Identifier.

(3) In the case that the source-side access network node is an RNC, the target-side access network node is an eNB, and the source-side core network node is an SGSN, the identification information of the source-side core network node includes but is not limited to a Global CN-ID, a combination of an RAI and an NRI, or a GUMMEI into which a combination of an RAI and an NRI is mapped, and the identification information allocated for the UE by the source-side core network node includes but is not limited to an Old Iu Signalling Connection Identifier.

(4) In the case that the source-side access network node is an eNB, the target-side access network node is an RNC, and the source-side core network node is an MME, the identification information of the source-side core network node includes but is not limited to a GUMMEI, or a combination of an RAI and an NRI, where a GUMMEI is mapped into the combination; and the identification information allocated for the UE by the source-side core network node includes but is not limited to a Source MME UE S1AP ID.

A target-side core network node selection unit 62 is adapted to select a target-side core network node after the handover message reception unit 61 receives the handover message.

A handover message transmitting unit 63 is adapted to transmit a handover message to the target-side core network node selected by the target-side core network node selection unit 62. The handover message also includes the identification information of the source-side core network node and the identification information allocated for the UE by the source-side core network node as described above.

In an embodiment of the invention, the target-side access network node may select the target-side core network node based on a condition of load balance. That is, a target-side core network node with a lowest load is selected and accessed to achieve the load balance.

A handover acknowledgement message reception unit 64 is adapted to receive a handover acknowledgement message transmitted by the target-side core network node, after the handover message transmitting unit 63 transmits the handover message.

A resource release message transmitting unit 65 is adapted to transmit a resource release message to the source-side access network node based on the handover acknowledgement message received by the handover acknowledgement message reception unit 64, after the handover acknowledgement message reception unit 64 receives the handover acknowledgement message.

In an embodiment of the invention, the source-side access network node transmits the handover message to the target-side access network node, the target-side access network node selects the target-side core network node and transmits the handover message to the target-side core network node, and the target-side core network node requests for context information of the UE from the source-side core network node, thereby completing a handover. Thus, the handover may be implemented through less times of signalling interactions between nodes, which avoids network congestion caused by multiple times of signalling interactions.

Figure 7:
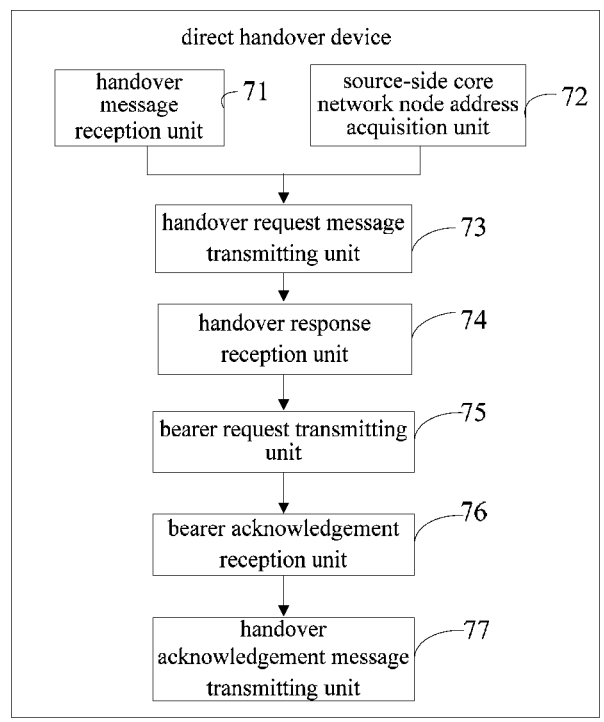
FIG. 7 is a structural diagram of a direct handover device according to another embodiment of the invention.

FIG. 7 is a structural diagram of a direct handover device according to another embodiment of the invention, and only parts related to the embodiment of the invention are shown for convenience of explanation. The device includes following units.

A handover message reception unit 71 is adapted to receive a handover message transmitted by a target-side access network node. The handover message carries identification information of a source-side core network node and identification information allocated for UE by the source-side core network node.

In an embodiment of the invention, a target-side core network node receives the handover message transmitted by the target-side access network node. The target-side core network node is selected by the target-side access network node based on a condition of load balance. A target-side core network node with a lowest load is selected and accessed to achieve the load balance.

A source-side core network node address acquisition unit 72 is adapted to acquire an address of the source-side core network node, based on the identification information of the source-side core network node received by the handover message reception unit 71.

A handover request message transmitting unit 73 is adapted to transmit a handover request message to the source-side core network node, an address of the source-side core network node being acquired by the source-side core network node address acquisition unit 72. The handover request message includes the identification information allocated for the UE by the source-side core network node and acquired by the handover message reception unit 71.

A handover response reception unit 74 is adapted to receive a handover response message transmitted by the source-side core network node, after the handover request message transmitting unit 73 transmits the handover request message. The handover response message includes an international mobile subscriber identifier (IMSI) of the UE, context information of mobility management, and context information of session management.

A bearer request transmitting unit 75 is adapted to transmit a bearer update request or a bearer creating request to a user plane node after the handover response reception unit 74 receives the handover response message, where the user plane node may be a serving gateway (S-GW).

In an embodiment of the invention, a connected user plane node S-GW may alters in a handover process of communication nodes. Hence, the bearer update request is transmitted if the user plane node S-GW does not alter; and the bearer creating request is transmitted if the user plane node S-GW alters.

The bearer acknowledgement reception unit 76 is adapted to receive a bearer update acknowledgement message or a bearer creating acknowledgement message transmitted by the user plane node S-GW, after the bearer request transmitting unit 75 transmits a bearer update request or a bearer creating request.

A handover acknowledgement message transmitting unit 77 is adapted to transmit a handover acknowledgement message to the source-side core network node after the handover response reception unit 74 receives the handover response message, where the source-side core network node initiates a resource release to a source-side access network node.

In an embodiment of the invention, the source-side access network node transmits the handover message to the target-side access network node, the target-side access network node selects the target-side core network node and transmits the handover message to the target-side core network node, and the target-side core network node requests for context information of the UE from the source-side core network node, thereby completing a handover. Thus, the handover may be implemented through less times of signalling interactions between nodes, which avoids network congestion caused by multiple times of signalling interactions.

Figure 8:
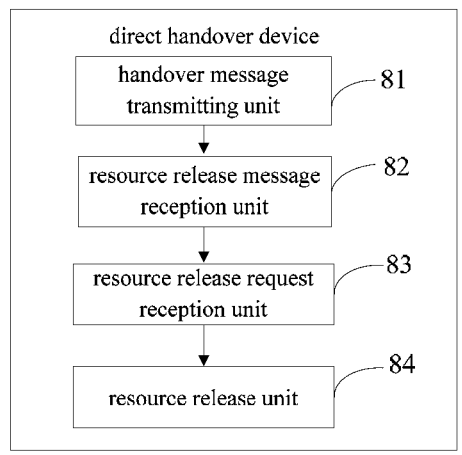
FIG. 8 is a structural diagram of a direct handover device according to further another embodiment of the invention.

FIG. 8 is a structural diagram of a direct handover device according to further another embodiment of the invention. The device includes following units.

A handover message transmitting unit 81 is adapted to transmit a handover message to a target-side access network node.

In an embodiment of the invention, the handover message transmitting unit 81 transmits to the target-side access network node a handover starting message, i.e., the handover message. The handover message carries identification information of a source-side core network node and identification information allocated for UE by the source-side core network node. In a subsequent step, a target-side core network node may acquire an address of the source-side core network node based on the identification information of the source-side core network node. The target-side core network node may acquire context information of the UE from the source-side core network node based on the identification information allocated for the UE by the source-side core network node.

A resource release message reception unit 82 is adapted to receive a resource release message transmitted by the target-side access network node, after the handover message transmitting unit 81 transmits the handover message.

In an embodiment of the invention, a target-side node (including the target-side core network node and the target-side access network node) may transmit the resource release message to a source-side node after a completion of a handover. Specifically, a source-side access network node receives the resource release message transmitted by the target-side access network node, and the source-side core network node receives the resource release message transmitted by the target-side core network node.

A resource release request reception unit 83 is adapted to receive a resource release request initiated by the source-side core network node, after the resource release message reception unit 82 receives the resource release message.

A resource release unit 84 is adapted to perform a resource release with the source-side core network node, based on the resource release request received by the resource release request reception unit 83.

In an embodiment of the invention, the source-side node starts releasing the resource after receiving the resource release message. Specifically, the source-side core network node transmits the resource release request to the source-side access network node, and the source-side access network node release the resource based on the request.

Figure 9:
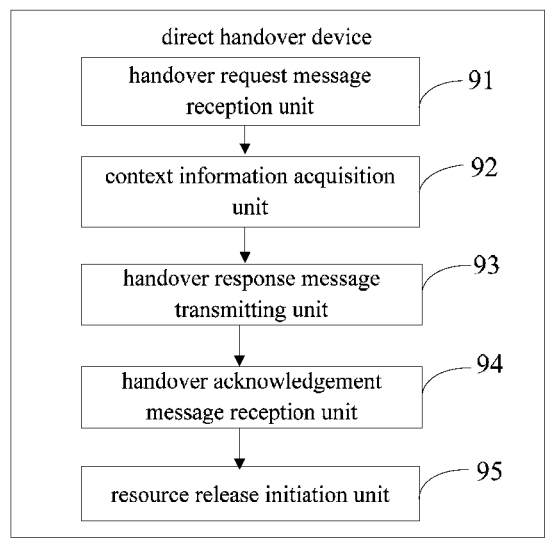
FIG. 9 is a structural diagram of a direct handover device according to further another embodiment of the invention.

FIG. 9 is a structural diagram of a direct handover device according to further another embodiment of the invention. The device includes following units.

A handover request message reception unit 91 is adapted to receive a handover request message transmitted by a target-side core network node. The handover request message includes identification information allocated for UE by a source-side core network node.

In an embodiment of the invention, the handover request message reception unit 91 receives the handover request message transmitted by the target-side core network node, where the handover request message includes the identification information allocated for the UE by the source-side core network node.

A context information acquisition unit 92 is adapted to acquire context information of the UE, based on the identification information allocated for the UE and carried in the handover request message received by the handover request message reception unit 91

In an embodiment of the invention, the source-side core network node searches for the stored context information of the UE based on the identification information. The context information includes an international mobile subscriber identifier IMSI of the UE, context information of mobility management, and context information of session management.

A handover response message transmitting unit 93 is adapted to transmit a handover response message to the target-side core network node after the context information acquisition unit 92 acquires the context information. The handover response message includes the context information of the UE, which is acquired by the context information acquisition unit 92.

In an embodiment of the invention, the handover response message transmitting unit 93 transmits the handover response message to the target-side core network node. The handover response message includes the acquired context information of the UE. The target-side core network node may build context information with the UE based on the context information of the UE.

According to an optional embodiment of the invention, the device further includes:

a handover acknowledgement message reception unit 94 is adapted receive a handover acknowledgement message transmitted by the target-side core network node, after the handover response message transmitting unit 93 transmits the handover response message; and a resource release initiation unit 95 is adapted to initiate a resource release to a source-side access network node, based on the handover acknowledgement message received by the handover acknowledgement message reception unit 94.

Figure 10:
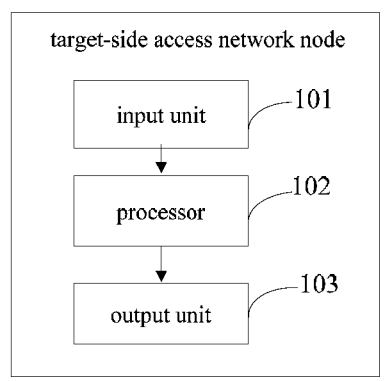
FIG. 10 is a structural diagram of a direct handover apparatus according to an embodiment of the invention.

FIG. 10 is a structural diagram of a direct handover apparatus according to an embodiment of the invention. The apparatus includes an input unit 101, a processor 102 and an output unit 103. The processor 102 executes the following steps.

A handover message transmitted by a source-side access network node is received.

In an embodiment of the invention, the source-side access network node transmits the handover message to a target-side access network node, and the handover message carries identification information of a source-side core network node and identification information allocated for UE by the source-side core network node. In different communication networks, identification information of the source-side core network node is different, and identification information for the UE allocated by the source-side core network node is also different. Details will be described as follows.

(1). In the case that the source-side access network node is an evolved node base station (eNB), the target-side access network node is an eNB, and the source-side core network node is a mobility management entity (MME), the identification information of the source-side core network node includes but is not limited to a globally unique MME identifier (GUMMEI), and the identification information allocated for the UE by the source-side core network node includes but is not limited to a Source MME UE S1AP ID.

(2). In the case that the source-side access network node is a radio network controller (RNC), the target-side access network node is an RNC, and the source-side core network node is a serving GPRS support node (SGSN), the identification information of the source-side core network node includes but is not limited to a global core network identifier (Global CN-ID), or a combination of a routing area identifier (RAI) and a network resource identifier (NRI), and the identification information allocated for the UE by the source-side core network node includes but is not limited to an Old Iu Signalling Connection Identifier.

(3) In the case that the source-side access network node is an RNC, the target-side access network node is an eNB, and the source-side core network node is an SGSN, the identification information of the source-side core network node includes but is not limited to a Global CN-ID, a combination of an RAI and an NRI, or a GUMMEI into which a combination of an RAI and an NRI is mapped; and the identification information allocated for the UE by the source-side core network node includes but is not limited to an Old Iu Signalling Connection Identifier.

(4) In the case that the source-side access network node is an eNB, the target-side access network node is an RNC, and the source-side core network node is an MME, the identification information of the source-side core network node includes but is not limited to a GUMMEI, or a combination of an RAI and an NRI, where a GUMMEI is mapped into the combination; and the identification information allocated for the UE by the source-side core network node includes but is not limited to a Source MME UE S1AP ID.

A target-side core network node is selected, and a handover message is transmitted to the target-side core network node. The handover message also includes the identification information of the source-side core network node and the identification information allocated for the UE by the source-side core network node as described above, to make the target-side core network node acquire context information of the UE from the source-side core network node. The context information includes an international mobile subscriber identifier (IMSI) of the UE, context information of mobility management, and context information of session management.

In an embodiment of the invention, the target-side access network node may select the target-side core network node based on a condition of load balance. That is, a target-side core network node with a lowest load is selected and accessed to implement the load balance.

A handover acknowledgement message transmitted by the target-side core network node is received.

In an embodiment of the invention, the target-side access network node confirms that a communication link is established between the target-side core network node and the target-side access network node, after receiving the handover acknowledgement message transmitted by the target-side core network node. Then, the target-side access network node transmits a resource release message to the source-side access network node, to make the source-side access network node release resource which is no longer used.

According to an optional embodiment of the invention, the processor 112 further executes the following step:

transmitting a resource release message to the source-side access network node based on the handover acknowledgement message, where a resource between the source-side access network node and the source-side core network node is released.

In an embodiment of the invention, the source-side access network node transmits the handover message to the target-side access network node, the target-side access network node selects the target-side core network node and transmits the handover message to the target-side core network node, and the target-side core network node requests for the context information of the UE from the source-side core network node, thereby completing a handover. Thus, the handover may be implemented through less times of signalling interactions between nodes, which avoids network congestion caused by multiple times of signalling interactions.

Figure 11:
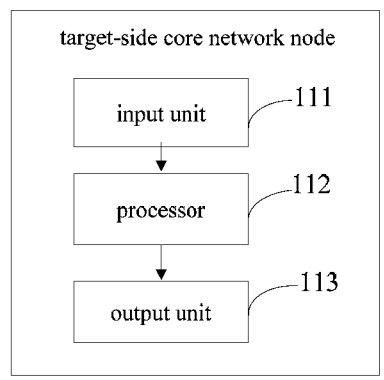
FIG. 11 is a structural diagram of a direct handover apparatus according to another embodiment of the invention.

FIG. 11 is a structural diagram of a direct handover apparatus according to an embodiment of the invention. The apparatus includes an input unit 111, a processor 112 and an output unit 113. The processor 112 executes the following steps.

A handover message transmitted by a target-side access network node is received. The handover message carries identification information of a source-side core network node, and identification information allocated for UE by the source-side core network node.

In an embodiment of the invention, a target-side core network node receives the handover message transmitted by the target-side access network node. The target-side core network node may be selected by the target-side access network node based on a condition of load balance. A target-side core network node with a lowest load is selected and accessed to achieve the load balance.

An address of the source-side core network node is acquired based on the identification information of the source-side core network node, and a handover request message is transmitted to the source-side core network node. The handover request message includes the identification information allocated for the UE by the source-side core network node.

A handover response message transmitted by the source-side core network node is received. The handover response message includes an international mobile subscriber identifier (IMSI) of the UE, context information of mobility management, and context information of session management.

A bearer update request or a bearer creating request is transmitted to a user plane node, where the user plane node may be a serving gateway (S-GW).

In an embodiment of the invention, a connected user plane node S-GW may alters in a handover process of communication nodes. Hence, the bearer update request is transmitted if the user plane node S-GW does not alter; and the bearer creating request is transmitted if the user plane node S-GW alters.

A bearer update acknowledgement message or bearer creating acknowledgement message transmitted by the user plane node S-GW is received, a handover acknowledgement message is transmitted to the source-side core network node, and a handover acknowledgement message is transmitted to the target-side access network node.

In an embodiment of the invention, the target-side core network node informs source-side nodes that the handover is completed, after receiving the bearer update acknowledgement message or bearer creating acknowledgement message from the S-GW. Specifically, the target-side core network node transmits the handover acknowledgement message to the target-side access network node and the source-side core network node respectively, and the source-side core network node initiates a resource release to a source-side access network node.

In an embodiment of the invention, the source-side access network node transmits the handover message to the target-side access network node, the target-side access network node selects the target-side core network node and transmits the handover message to the target-side core network node, and the target-side core network node requests for context information of the UE from the source-side core network node, thereby completing a handover. Thus, the handover may be implemented through less times of signalling interactions between nodes, which avoids network congestion caused by multiple times of signalling interactions.

Figure 12:
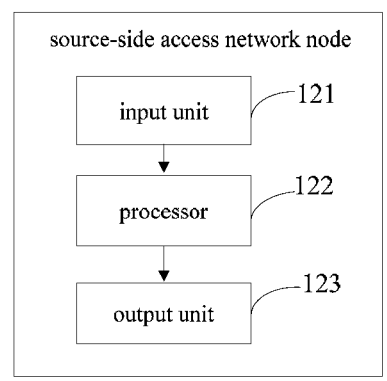
FIG. 12 is a structural diagram of a direct handover apparatus according to further another embodiment of the invention.

FIG. 12 is a structural diagram of a direct handover apparatus according to another embodiment of the invention. The apparatus includes an input unit 121, a processor 122 and an output unit 123. The processor 122 executes the following steps.

A handover message is transmitted to a target-side access network node.

In an embodiment of the invention, a source-side access network node transmits to the target-side access network node a handover starting message, i.e., the handover message. The handover message carries identification information of a source-side core network node and identification information allocated for UE by the source-side core network node. In a subsequent step, a target-side core network node may acquire an address of the source-side core network node based on the identification information of the source-side core network node. The target-side core network node may acquire context information of the UE from the source-side core network node based on the identification information allocated for the UE by the source-side core network node.

A resource release message transmitted by the target-side access network node is received.

In an embodiment of the invention, a target-side node (including the target-side core network node and the target-side access network node) may transmit the resource release message to a source-side node after a completion of the handover. Specifically, the source-side access network node receives the resource release message transmitted by the target-side access network node, and the source-side core network node receives the resource release message transmitted by the target-side core network node.

A resource release request transmitted by the source-side core network node is received, and a resource release is performed with the source-side core network node.

In an embodiment of the invention, the source-side node starts releasing the resource after receiving the resource release message. Specifically, the source-side core network node initiates the resource release request to the source-side access network node, and the source-side access network node performs the resource release based on the request.

Figure 13:
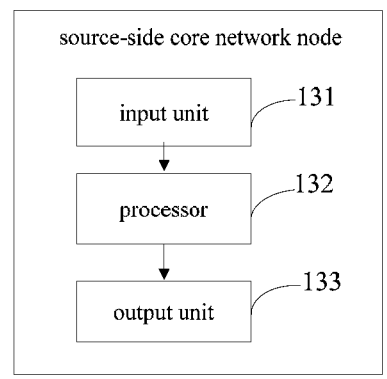
FIG. 13 is a structural diagram of a direct handover apparatus according to further another embodiment of the invention.

FIG. 13 is a structural diagram of a direct handover apparatus according to further another embodiment of the invention. The apparatus includes an input unit 131, a processor 132 and an output unit 133. The processor 132 executes the following steps.

A handover request message transmitted by a target-side core network node is received. The handover request message includes identification information allocated for UE by a source-side core network node.

In an embodiment of the invention, the source-side core network node receives the handover request message transmitted by the target-side core network node, where the handover request message includes the identification information allocated for the UE by the source-side core network node.

Context information of the UE is acquired based on the identification information.

In an embodiment of the invention, the source-side core network node searches for the stored context information of the UE based on the identification information. The context information includes an international mobile subscriber identifier IMSI of the UE, context information of mobility management, and context information of session management.

A handover response message is transmitted to the target-side core network node. The handover response message includes the acquired context information of the UE.

In an embodiment of the invention, the source-side core network node transmits the handover response message to the target-side core network node in response to the handover request message in the foregoing step. The handover response message includes the acquired context information of the UE. The target-side core network node may build context information with the UE based on the context information of the UE.

According to an optional embodiment of the invention, the processor 132 further executes the following step:

receiving a handover acknowledgement message transmitted by the target-side core network node; and initiating a resource release to a source-side access network node based on the handover acknowledgement message.

Those skilled in the art may understand that the respective units in the embodiments are merely divided according to functional logic, but it is not limited to the above division as long as corresponding functions can be achieved. In addition, specific names of the respective functional units are merely intended to conveniently distinguish the functional units from each other, rather than to limit the protection scope of the invention.

It is also understandable for those skilled in the art that all of or a part of the steps of the methods according to the embodiments may be performed by related hardware instructed by a program. The program may be stored in a computer readable storage medium. The storage medium includes an ROM/RAM, a magnetic disk, an optical disk, etc.

Those disclosed are merely preferred embodiments of the invention, which are not intended to limit the invention. Any modification, equivalent replacements and improvements made within the spirit and principle of the invention should all fall within the protection scope of the invention.

What is claimed is:

1. A direct handover method, comprising:
   receiving, by a target-side access network node, a handover message from a source-side access network node;
   selecting, by the target-side access network node, a target-side core network node, and transmitting the handover message to the target-side core network node to facilitate handover from the source-side access network node and a source-side core network node to the target-side access network node and the target-side core network node, wherein the handover includes the target-side core network node acquiring context information of a User Equipment (UE) from the source-side core network node; and receiving, by the target-side access network node, a handover acknowledgement message from the target-side core network node;
wherein the handover acknowledgement message is sent by the target-side core network node to the source-side core network node to facilitate the source-side core network node initiating a resource release with the source-side access network node in response to the handover acknowledgement message, and wherein the handover acknowledgement message is sent by the target-side core network node to the target-side access network node after the handover acknowledgement message is sent by the target-side core network node to the source-side core network node.

2. The method according to claim 1, wherein the handover message carries identification information of the source-side core network node, and identification information allocated for the UE by the source-side core network node.

3. The method according to claim 1, wherein selecting the target-side core network node is based on load balancing.

4. The method according to claim 1, further comprising:
transmitting, by the target-side access network node, a resource release message to the source-side access network node after receiving the handover acknowledgement message.

5. The method according to claim 2, wherein the identification information of the source-side core network node comprises at least one of:
a globally unique mobility management entity identifier (GUMMEI);
a global core network identifier (Global CN-ID); or
a combination of a routing area identifier (RAI) and a network resource identifier (NRI).

6. The method according to claim 2, wherein the identification information allocated for the UE by the source-side core network node comprises at least one of:
an S1 application protocol identifier allocated by a source-side Mobility Management Entity (MME);
an Iu signalling connection identifier; or
a temporary logical link identity (TLLI).

7. A direct handover method, comprising:
receiving, by a target-side core network node, a handover message from a target-side access network node, wherein the handover message carries identification information of a source-side core network node and identification information allocated for User Equipment (UE) by the source-side core network node;
acquiring, by the target-side core network node, an address of the source-side core network node based on the identification information of the source-side core network node, and transmitting a handover request message to the source-side core network node to facilitate handover from a source-side access network node and the source-side core network node to the target-side access network node and the target-side core network node, wherein the handover request message carries the identification information allocated for the UE by the source-side core network node, and wherein the handover includes the source-side core network node acquiring context information of the UE based on the identification information allocated for the UE by the source-side core network node;
receiving, by the target-side core network node, a handover response message from the source-side core network node;
transmitting, by the target-side core network node, a handover acknowledgement message to the source-side core network node to facilitate the source-side core network node initiating a resource release with the source-side access network node; and
transmitting, by the target-side core network node, the handover acknowledgement message to the target-side access network node after the target-side core network node transmits the handover acknowledgement message to the source-side core network node.

8. The method according to claim 7, wherein the identification information of the source-side core network node comprises at least one of:
a globally unique mobility management entity identifier (GUMMEI);
a global core network identifier (Global CN-ID); or
a combination of a routing area identifier (RAI) and a network resource identifier (NRI).

9. The method according to claim 7, wherein the identification information allocated for the UE by the source-side core network node comprises at least one of:
an S1 application protocol identifier allocated by a source-side Mobility Management Entity (MME);
an Iu signalling connection identifier; or
a temporary logical link identity (TLLI).

10. The method according to claim 7, wherein the handover response message comprises the context information of the UE, and the context information of the UE comprises an international mobile subscriber identifier (IMSI) of the UE, context information of mobility management, and context information of session management.

11. A system, comprising:
a target-side access network node device; and
a target-side core network node;
wherein the target-side access network node device is configured to:
receive a handover message from a source-side access network node;
select the target-side core network node;
transmit the handover message to the target-side core network node to facilitate handover from the source-side access network node and a source-side core network node to the target-side access network node and the target-side core network node; and
receive a handover acknowledgement message from the target-side core network node;
wherein the target-side core network node is configured to:
send the handover acknowledgement message to the source-side core network node to facilitate the source-side core network node initiating a resource release with the source-side access network node in response to the handover acknowledgement message; and
send the handover acknowledgement message to the target-side access network node after sending the handover acknowledgement message to the source-side core network node.

12. The system according to claim 11, wherein the handover message carries identification information of the source-side core network node, and identification information allocated for a User Equipment (UE) by the source-side core network node.

13. The system according to claim 11, wherein selection of the target-side core network node is based on load balancing.

14. The system according to claim 11, wherein the target-side access network node device is further configured to:

transmit a resource release message to the source-side access network node based on the handover acknowledgement message.

15. The system according to claim 12, wherein the identification information of the source-side core network node comprises at least one of:
 a globally unique mobility management entity identifier (GUMMEI);
 a global core network identifier (Global CN-ID); or
 a combination of a routing area identifier (RAI) and a network resource identifier (NRI).

16. The system according to claim 12, wherein the identification information allocated for the UE by the source-side core network node comprises at least one of:
 an S1 application protocol identifier allocated by a source-side Mobility Management Entity (MME);
 an Iu signalling connection identifier; or
 a temporary logical link identity (TLLI).

17. A target-side core network node device, comprising a receiver, a transmitter, a processor, and a non-transitory processor-readable medium having processor-executable instructions stored thereon, wherein the device is configured to include a plurality of units, the units including:
 a handover message reception unit, adapted to receive a handover message from a target-side access network node, wherein the handover message carries identification information of a source-side core network node and identification information allocated for a User Equipment (UE) by the source-side core network node;
 a source-side core network node address acquisition unit, adapted to acquire an address of the source-side core network node based on the identification information of the source-side core network node;
 a handover request message transmitting unit, adapted to transmit a handover request message to the source-side core network node to facilitate handover from a source-side access network node and the source-side core network node to the target-side access network node and the target-side core network node;
 a handover response message reception unit, adapted to receive a handover response message from the source-side core network node; and
 a handover acknowledgement message transmitting unit, adapted to:
  transmit a handover acknowledgement message to the source-side core network node to facilitate the source-side core network node initiating a resource release with the source-side access network node; and
  transmit the handover acknowledgement message to the target-side access network node after transmitting the handover acknowledgement message to the source-side core network node.

18. The device according to claim 17, wherein the identification information of the source-side core network node comprises at least one of:
 a globally unique mobility management entity identifier (GUMMEI);
 a global core network identifier (Global CN-ID); or
 a combination of a routing area identifier (RAI) and a network resource identifier (NRI).

19. The device according to claim 17, wherein the identification information allocated for the UE by the source-side core network node comprises at least one of:
 an S1 application protocol identifier allocated by a source-side Mobility Management Entity (MME);
 an Iu signalling connection identifier; or
 a temporary logical link identity (TLLI).

20. The device according to claim 17, wherein the handover response message comprises context information of the UE, and the context information of the UE comprises an international mobile subscriber identifier (IMSI) of the UE, context information of mobility management, and context information of session management.

* * * * *